Nov. 7, 1967

L. O. MESENHIMER 3,351,849

FERRORESONANT VOLTAGE REGULATING AND
HARMONIC SUPPRESSING CIRCUIT

Filed April 28, 1964

*INVENTOR.*
LEE O. MESENHIMER
BY
ATTY

Nov. 7, 1967   L. O. MESENHIMER   3,351,849
FERRORESONANT VOLTAGE REGULATING AND
HARMONIC SUPPRESSING CIRCUIT
Filed April 28, 1964   2 Sheets-Sheet 2

*INVENTOR.*
LEE O. MESENHIMER
BY
ATTY

United States Patent Office 3,351,849
Patented Nov. 7, 1967

3,351,849
FERRORESONANT VOLTAGE REGULATING AND HARMONIC SUPPRESSING CIRCUIT
Lee O. Mesenhimer, Lakewood, Ohio, assignor to Lorain Products Corporation, a corporation of Ohio
Filed Apr. 28, 1964, Ser. No. 363,222
10 Claims. (323—45)

ABSTRACT OF THE DISCLOSURE

A voltage regulating circuit for connection between a square wave source and a load requiring a sinusoidal input. An input winding is disposed on a non-saturable core section and coupled thereto is a load compensating or regulating winding and a harmonic canceling winding. A tuned winding and an output winding are disposed on a saturable core section. The regulating winding and the output winding are connected across the load and in such a manner that the voltages induced thereon are in opposition. The tuned winding and the harmonic canceling winding are connected together through series resonant circuits whereby residual odd harmonics are surpressed. The series resonant circuits each include a capacitor and an inductor.

---

This invention relates to voltage regulating circuits and is directed more particularly to a voltage regulating circuit of the ferroresonant type.

Ferroresonant voltage regulating circuits are well-known in the electrical art and such circuits have been satisfactory in the past to provide a regulated alternating voltage output when an unregulated alternating voltage is supplied thereto. The output voltage regulation of such ferroresonant circuits may be greatly improved by the provision of a compensating winding which is coupled to the input voltage and connected serially between the output winding of the ferroresonant circuit and the load connected thereacross. The compensating winding is connected in such a manner that the voltage on it opposes or bucks the voltage of the output winding. Thus if the input voltage to the ferroresonant circuit increases, the voltage of the compensating winding will increase thereby substantially canceling the voltage increase which would otherwise appear on the output winding. A decrease of input voltage will reduce the bucking effect of the compensating winding so that the output voltage drop is minimized.

The above described circuit functions satisfactorily where the input voltage is a sinusoidal waveshape. However, when such a ferroresonant circuit is to be connected between a load requiring a sinusoidal voltage and a source of square wave voltage, as for example a transistor oscillator, a number of problems arise.

First, the ferroresonant circuit introduces a large number of odd harmonics in the voltage supplied to the load. This causes the output voltage to be nonsinusoidal. Secondly, because the compensating winding is coupled to the input square wave voltage, harmonic distortion in the form of notches is produced on the output voltage waveshape due to the rapid polarity reversals of the square wave voltage induced on the compensating winding by the input voltage.

Accordingly, it is an object of the invention to provide a ferroresonant regulating circuit which, when supplied with an unregulated square wave voltage, provides a regulated sinusoidal output voltage.

It is an additional object of the invention to provide improved circuitry in which undesired harmonics are prevented from being transmitted to the load.

It is a further object of the invention to provide a ferroresonant regulating circuit arranged to provide an output from which harmonics are selectively removed as required by overall circuit operation.

It is another object of the invention to provide a ferroresonant voltage regulating circuitw hich converts an unregulated square wave voltage to a regulated sine wave voltage and which utilizes saturable and nonsaturable magnetic cores of simple construction.

It is another object of the invention to provide a ferroresonant voltage regulating circuit which converts an unregulated voltage having high harmonic content to a regulated voltage having low harmonic content and which utilizes saturable and nonsaturable magnetic cores of simple construction.

Still another object of the invention is to provide a ferroresonant regulating circuit in which a first portion of the input voltage is connected in opposition to the output voltage to improve the regulation characteristics and in which a second portion of the input voltage is connected in opposition to the voltage of the tuned winding of the ferroresonant circuit to prevent harmonic distortion from appearing on the voltage of the output winding.

Another object of the invention is to provide a circuit of the above character in which a plurality of series resonant circuits are connected across the tuned winding.

It is yet another object of the invention to provide a ferroresonant voltage regulating circuit in which a plurality of resonant circuits are connected across the tuned winding of the ferroresonant circuit through a harmonic cancelling winding carried on a nonsaturable core and coupled to the input voltage.

Still another object of the invention is to provide an alternating current voltage regulator in which a ferroresonant circuit includes an input coupled harmonic canceling winding carried on a nonsaturable core and connected in voltage opposition to the tuned winding and in which a compensating winding is provided to improve the voltage regulating characteristics.

Other objects and advantages of the invention become apparent from the following description and accompanying drawings in which.

Figure 1:
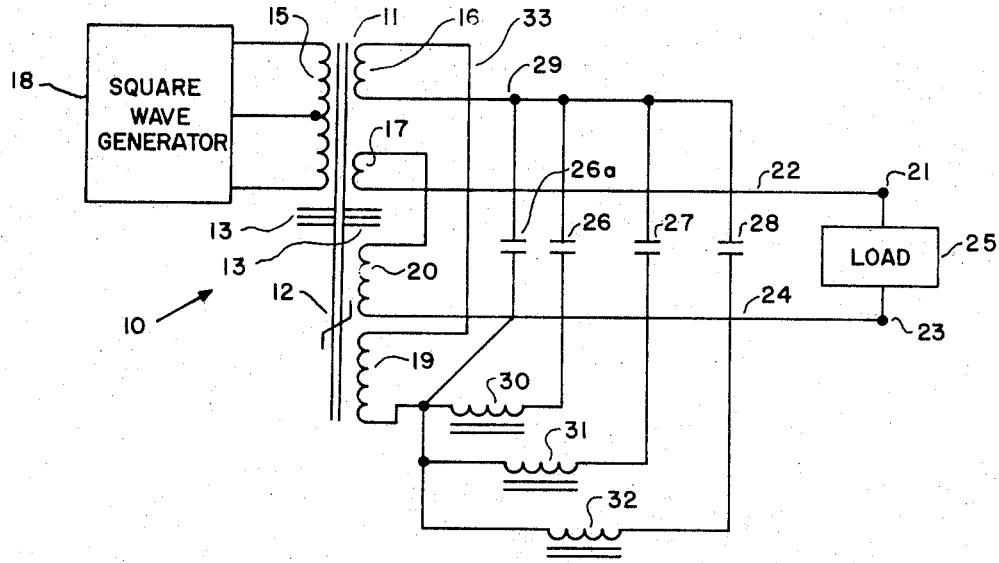
FIGURE 1 is a schematic diagram of one embodiment of the invention.
Figure 2:
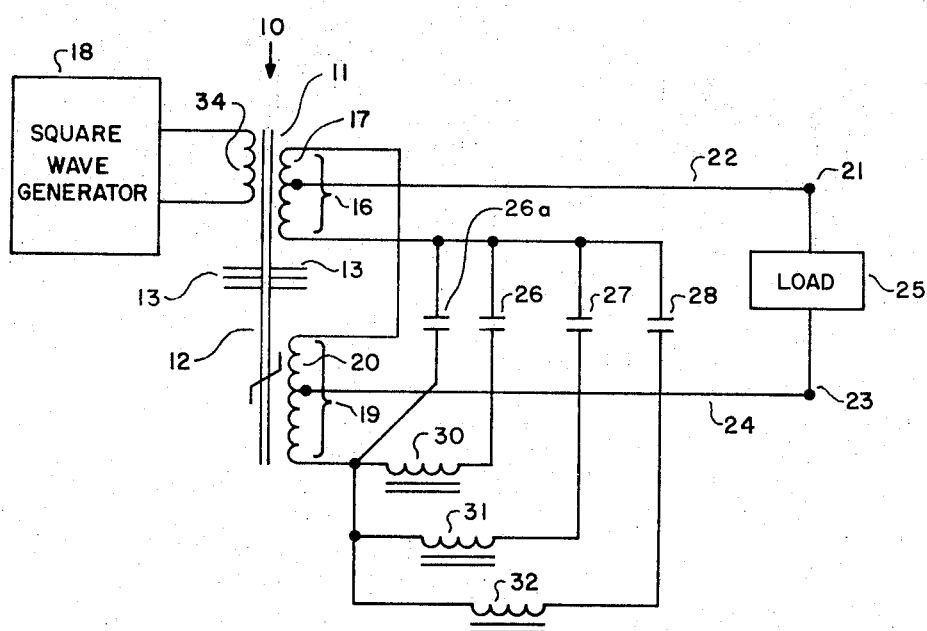
FIGURE 2 is a schematic diagram of a modification of the invention.
Figure 2A:
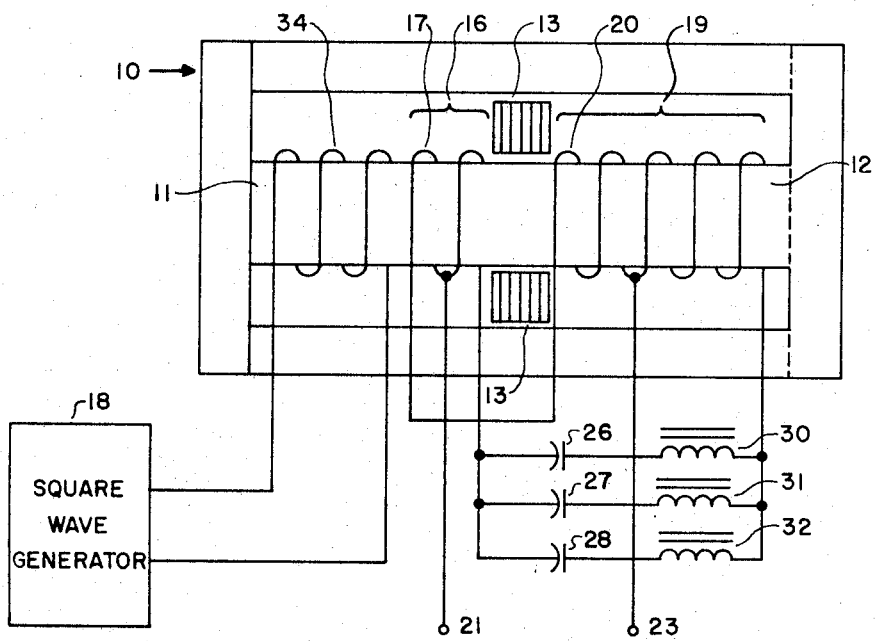
Figure 3:
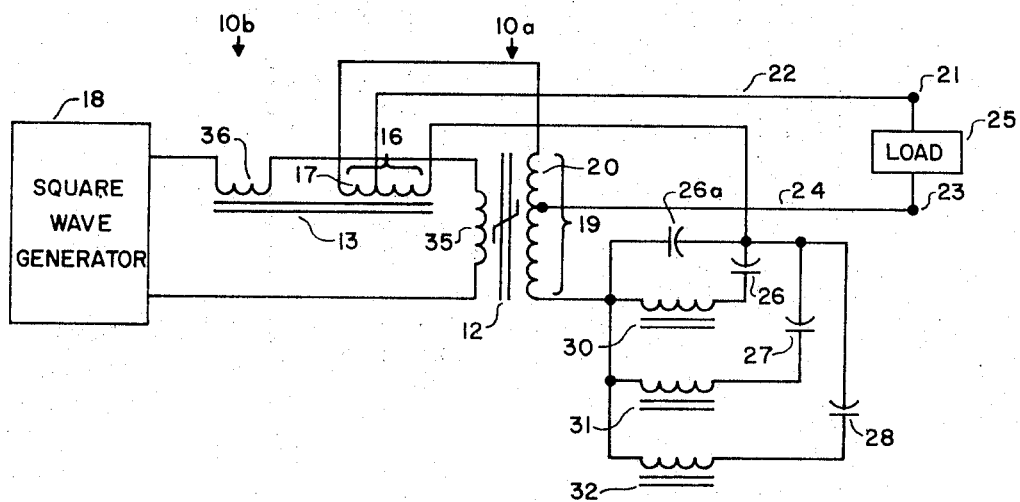

FIGURE 2a is an elevation of an exemplary transformer of the type used in the circuit of FIGURE 2, the associated circuitry being shown in schematic form and, FIGURE 3 is a schematic drawing showing still another modification of the circuitry incorporating the invention, Referring to FIGURE 1, it will be seen that circuitry embodying the invention may include a saturable transformer 10 having a nonsaturable core portion 11 and a saturable core portion 12. In order to provide flux paths so that saturation may occur in the saturable portion 12, magnetic leakage paths 13 are provided in the transformer 10.

The nonsaturable core portion of the transformer 10 carries a center tapped input winding 15, a harmonic cancelling winding 16 and a compensating winding 17. The input winding 15 is connected in push-pull arrangement with a square wave generator 18 which may be, for example, a suitable oscillator of the type well-known in the art such as those utilizing transistors or other semiconductor devices. It will be understood, of course, that the winding 15 may be replaced by a single winding for use with a suitable square wave generator, rather than the push-pull arrangement described herein.

The saturable core portion 12 of the transformer 10 is provided with a tuned winding 19 and an output winding 20. The output circuit for the ferroresonant voltage regulating circuit embodying the invention is formed by connecting the lower end of the compensating winding 17 to an output terminal 21 through a lead 22, by connecting the lower end of the output winding 20 to an output terminal 23 by means of a lead 24, and by connecting the upper ends of windings 17 and 20 together. A suitable load 25 may be connected between the output terminals 21 and 23 which, with leads 22 and 24, serve as output means. The compensating winding 17 is coupled to the input winding 15 and is connected in such a manner that the voltage induced thereon is in opposition to the voltage produced across the output winding 20 by a ferroresonant circuit which will be described presently.

This ferroresonant circuit, in a manner well-known to those skilled in the art, serves to maintain the voltage across output winding 20 at a relatively constant magnitude despite variations of the voltage applied to the input winding 15 or changes in the current drawn by the load 25. The compensating winding 17 aids the ferroresonant circuit in this voltage regulating function and increases the degree of regulation. For example, if the voltage across winding 15 increases, the voltage across the compensating winding 17 will also increase and, since winding 17 is connected in voltage opposition to winding 20, will cancel the slight voltage increase which would otherwise appear across the output winding 20.

When the voltage supplied to the input winding 15 is of the square wave type, the voltage appearing on the compensating winding 17 will be a square wave while, due to the nature of a ferroresonant circuit, the voltage appearing on the output winding 20 will be a distorted sine wave containing a great number of odd harmonics of the input frequency. As a result of the foregoing described voltages, the voltage supplied to the load 25 will be a distorted sine wave having additional harmonic distortion in the form of a variable position notch superimposed on each half cycle alternation. This harmonic distortion is caused by the rapid polarity reversals of the square wave voltage appearing on the compensating winding 17 and varies in position due to the changing phase relationship between the voltage of output winding 20 and the voltage of the compensating winding 17 as load current varies.

To the end that a regulated, substantially sinusoidal voltage will be delivered to the load 25, there is provided a ferroresonant circuit which includes the harmonic cancelling winding 16 and the tuned winding 19. The ferroresonant circuit is formed by connecting the like side of each of the capacitors 26, 27 and 28 to the lower end of the harmonic cancelling winding 16 by means of a lead 29 and by connecting the other side of each of the capacitors 26, 27 and 28 to the lower end of the tuned winding 19 through respective nonsaturable inductors 30, 31 and 32. To complete the ferroresonant circuit, the upper end of the harmonic cancelling winding 16 is connected to the upper end of the tuned winding 19 through a lead 33.

In order to provide a pure sinusoidal voltage across load 25, it is necessary to completely remove all the odd harmonics contained in the voltages appearing across the series combination of windings 17 and 20. However, a substantially sinusoidal voltage will be supplied to the load 25 if the third, fifth and seventh harmonics of the input voltage are eliminated.

To the end that the third harmonic will be eliminated, capacitor 26 and the inductor 30 are so chosen as to be series resonant to the third harmonic of the input voltage thereby shorting out this harmonic so that it does not appear in the ferroresonant circuit. In a like manner the capacitor 27 and the inductor 31 are series resonant to the fifth harmonic while the capacitor 28 and the inductor 32 are series resonant to the seventh harmonic. Since these series resonant circuits are tuned to frequencies greater than the operating frequency of the ferroresonant circuit they are capacitive in nature with respect to this latter frequency. The effective capacitance of these series resonant circuits is such that with winding 19 and the saturable core 12 a ferroresonant circuit operating at the frequency of the input voltage applied to the input winding 15 is formed.

The magnitude of harmonic volt-amperes handled by the inductors 30, 31 and 32 and the capacitors 26, 27 and 28 is small compared to the volt-amperes of the fundamental frequencies. Consequently, the inductors may be of small size relative to the size of the saturable transformer 10.

Where a slight amount of additional distortion can be tolerated by the load 25, the size of inductor 30 may be substantially reduced if a capacitor 26a is connected in parallel with the series resonant circuits. Also, in cases where the load does not require a high quality sine wave, the inductors 30, 31 and 32 may be removed from the circuit.

In the resonant circuit described above, a square wave voltage will be induced on the harmonic cancelling winding 16 from the input winding 15. The harmonic cancelling winding 16 is connected with the tuned winding 19 in such a manner that the voltages appearing across them are in opposition. As a result, the rapid polarity reversals of the square wave voltage induced on the winding 16 appear as notches across the timed winding 19. This induces notches in winding 20 of opposite polarity to those produced in the compensating winding 17. The notches of output winding 20 and those of the compensating winding 17 cancel each other and, consequently, a sinusoidal voltage free of harmonic distortion in the form of notches is suppled to the output terminals 21 and 23 and the load 25.

From the foregoing discription it will be seen that there is provided a ferroresonant voltage regulating circuit which may be supplied with a square wave input voltage and which will supply a substantially sinusoidal output voltage to a load. The voltage regulating circuitry embodying this invention eliminates from the sinusoidal voltage being delivered to a load, the harmonic distortion which would otherwise appear due to the rapid switching of the square wave input voltage and additionally that due to the distortion normally generated in a ferroresonant circuit.

The form of circuit shown in FIGURE 2 is similar to the circuit shown in FIGURE 1 and like parts have like numerals. FIGURE 2a illustrates the construction of the core and the arrangement of the windings of the circuit of FIG. 2. In the circuit of FIGURE 2, a single input winding 34 is connected to a square wave generator 18 not requiring a center tap connection.

The number of windings on the transformer 10 has been reduced by combining the tuned winding 19 and the output winding 20 into a single tapped winding and by replacing the harmonic cancelling winding 16 and the compensating winding 17 by a single tapped winding. The windings 16 and 19 in FIGURE 2 correspond to the windings 16 and 19 in FIGURE 1. However, in FIGURE 2 the sections 17 and 20 of the windings 16 and 19, respectively, are the equivalent of windings 17 and 20 in FIGURE 1. Thus it will be seen that in FIGURE 2 the required number of windings has been reduced thereby decreasing the size and cost of the transformer 10.

The structural aspects of an exemplary form of the transformer used in FIGURE 2 is shown in FIGURE 2a. In the latter figure, the numerals used are those of FIGURE 2.

The circuit shown in FIGURE 3 is a modification of the circuit of FIGURE 2 and like parts are identified by like numerals. All transformers utilized in the circuit of FIGURE 3 are of conventional construction and do not require magnetic leakage paths. It will be understood that while the components of FIGURE 3 may differ in size and electrical value from like numbered parts of FIGURES 1 and 2 due to electrical design considerations, the functions of like numbered parts are the same.

In the circuit of FIGURE 3 there is provided a transformer 10a having a saturable core 12. Additionally, there is provided a transformer 10b having a nonsaturable core 13 which is the electrical equivalent of the magnetic leakage paths 13 of FIGURE 2. The transformers 10a and 10b are energized by the input windings 35 and 36 carried on the cores 12 and 13, respectively. The windings 35 and 36 are serially connected in a single ended arrangement with the square wave generator 18. However, it is clear that the square wave generator may be connected in a push-pull arrangement by providing an additional input winding on each of the cores 12 and 13.

By providing separate transformers, one having a saturable core and the other a nonsaturable core preferably of the type having an air gap to afford a nonsaturable feature, the need for the magnetic leakage paths 13 shown in FIGURES 1 and 2 is eliminated. With this arrangement, the construction of the transformer cores 12 and 13 of transformers 10a and 10b, respectively, is greatly simplified.

It will be understood that the embodiments shown herein are for explanatory purposes and may be changed or modified without departing from the spirit and scope of the invention as defined in the claims appended hereto.

What I claim is:

1. In a voltage regulating circuit of the ferroresonant type, in combination, a saturable core transformer including an input winding, a tuned winding and an output winding, a plurality of series resonant circuits each comprising a capacitor and an inductor, each tuned to a different harmonic of the input voltage supplied to said input winding and each connected across said tuned winding, load compensating windings means coupled to said input winding for applying a first portion of said input voltage between said output winding and a load connected thereacross and in opposition to the voltage on said output winding, harmonic canceling winding means also coupled to said input winding for applying a second portion of said input voltage between said tuned winding and said series resonant circuits and in opposition to the voltage on said tuned winding whereby harmonic distortion is prevented from appearing on the load voltage.

2. In a voltage regulating circuit adapted to be interposed between an unregulated square wave source and a load requiring a regulated sine wave voltage, the combination of a transformer having a saturable core portion and a nonsaturable core portion, an input winding, a compensating winding and a harmonic cancelling winding arranged on said nonsaturable core portion, an output winding and a tuned winding arranged on said saturable core portion, a plurality of capacitors each having an inductor associated therewith to form a plurality of series resonant circuits, each of said series resonant circuits being tuned to a different odd harmonic of the input voltage, means for connecting one end of said compensating winding to one end of said output winding, the output voltage of the circuit being developed between the other end of said compensating winding and the other end of said output winding, means for connecting one end of said harmonic cancelling winding to one end of said tuned winding, means for connecting said plurality of series resonant circuits between the other end of said harmonic cancelling winding and the other end of said tuned winding.

3. In a voltage regulating circuit adapted to be interposed between an unregulated square wave source and a load requiring a regulated sine wave voltage, in combination, a transformer including a core having a saturable section and a nonsaturable section, an input winding and a tapped winding section on said nonsaturable section of said core, a tapped winding on said saturable section of said core, means connecting one end of said tapped winding on said nonsaturable section of said core to one end of said tapped winding on said saturable core, serially connected capacitative means and inductive means connected between the other end of said tapped winding on said nonsaturable core and the other end of said tapped winding on said saturable core, output means connected to the tap on said tapped winding on said saturable core and to the tap on said tapped winding on said nonsaturable core.

4. In a ferroresonant voltage regulating circuit, the combination of a saturable transformer including an output winding, a tuned winding and an input winding, a nonsaturable transformer including a compensating winding, a harmonic cancelling winding and an input winding, means for serially connecting said input winding of said saturable transformer and said input winding of said nonsaturable transformer across an A-C source, series resonant circuit means, means for serially connecting said output winding and said compensating winding in voltage opposing relationship across a load, means for serially connecting said tuned winding and said harmonic cancelling winding in voltage opposing relationship across said series resonant circuit means whereby a voltage of substantially sinusoidal waveshape is supplied to said load.

5. In a ferroresonant voltage regulating circuit adapted to provide a regulated sine wave output voltage to a load when supplied with an unregulated square wave voltage, in combination, a saturable transformer including an input winding adapted to receive energizing power, a tuned winding and an output winding for supplying current to said load, a plurality of series resonant circuits each comprising a capacitor and an inductor associated therewith, each of said series resonant circuits being tuned to a different odd harmonic of the input voltage, means for connecting said plurality of series resonant circuits across said tuned winding to form a ferroresonant circuit therewith, load compensating winding means and harmonic canceling winding means directly coupled to said input winding, the square wave voltages thereon being proportional to and having the same fundamental frequency as the input voltage, means for connecting said load compensating winding means between said output winding and said load and in voltage opposition to said output winding, means for connecting said harmonic canceling winding means between said tuned winding and said series resonant circuits connected thereacross and in voltage opposition to said tuned winding.

6. In a voltage regulating circuit of the ferroresonant type, in combination, a saturable core transformer including an input winding, a tuned winding and an output winding, capacitive means connected across the tuned winding to resonate therewith at the frequency of the voltage supplied to said input winding, winding means coupled to said input winding for applying a first portion of said input voltage between said output winding and a load connected thereacross and in opposition to the voltage on said output winding and winding means coupled to said input winding for applying a second portion of said input voltage between one end of said tuned winding and one end of said capacitive means and in opposition to the voltage on said tuned winding whereby harmonic distortion is prevented from appearing on the output voltage.

7. In a voltage regulating circuit adapted to be interposed between an unregulated square wave source and a load requiring a regulated sine wave voltage, in combination, a transformer including a core having a saturable section and a nonsaturable section, an input winding and a tapped winding section on said nonsaturable section of said core, a tapped winding on said saturable section of said core, means connecting one end of said tapped winding on said nonsaturable section of said core to one end of said tapped winding on said saturable core, serially connected first capacitive means and inductive means connected between the other end of said tapped winding on said nonsaturable core and the other end of said tapped winding on said saturable core, second capacitive means connected between said other end of said tapped winding on said nonsaturable core and said other end of said tapped winding on said saturable core, output means connected to the tap of said tapped winding on said nonsaturable core and to the tap on said tapped winding on said saturable core.

8. In a voltage regulating circuit of the ferroresonant type, a saturable core transformer including an input winding, a tuned winding and an output winding, harmonic suppressing means connected across said tuned winding, winding means coupled to said input winding for applying a first portion of said input voltage between said output winding and a load connected thereacross and in opposition to the voltage on said output winding, winding means also coupled to said input winding for connecting a second portion of said input voltage between said tuned winding and said harmonic suppressing means connected thereacross whereby harmonic distortion is prevented from appearing on the load voltage.

9. In a voltage regulating circuit of the ferroresonant type adapted to be energized by alternating current of high harmonic content and to supply substantially sinusoidal voltage to a load, in combination, a transformer having a saturable core portion and a nonsaturable core portion, input winding means, compensating winding means and harmonic cancelling winding means wound on said nonsaturable core portion, output winding means and tuned winding means wound on said saturable core portion, series resonant circuit means, means for serially connecting said output winding means and said compensating winding means in voltage opposing relationship across said load, means for serially connecting said harmonic cancelling winding means and said tuned winding means in voltage opposing relationship across said series resonant circuit means.

10. In a voltage regulating circuit of the ferroresonant type adapted to be energized by an alternating current of high harmonic content and to supply substantially sinusoidal voltage to a load, in combination, saturable core means and nonsaturable core means energized from an A-C source, a tapped winding on said nonsaturable core means, a tapped winding on said saturable core means, means for connecting one end of said tapped winding on said nonsaturable core means to one end of said tapped winding on said saturable core means, series resonant circuit means connected between the other end of said tapped winding on said nonsaturable core means and the other end of said tapped winding on said saturable core means, output means connected to the tap of said tapped winding on said nonsaturable core means and to the tap of said tapped winding of said saturable core means.

References Cited
UNITED STATES PATENTS

| | | | |
|---|---|---|---|
| 2,221,456 | 11/1940 | Pohm et al. | 323—61 |
| 2,434,493 | 1/1948 | Gburski | 323—60 X |
| 2,694,177 | 11/1954 | Sola | 323—60 |
| 2,825,024 | 2/1958 | Berghoff | 323—61 |
| 3,061,769 | 10/1962 | Smyth | 323—60 X |
| 3,219,916 | 11/1965 | Hart | 323—76 |
| 3,235,789 | 2/1966 | Naster | 323—48 X |

JOHN F. COUCH, *Primary Examiner.*

A. D. PELLINEN, *Assistant Examiner.*